United States Patent [19]

Röhrig

[11] 4,230,044
[45] Oct. 28, 1980

[54] AIRCRAFT PALLET FOR OVER-HANGING LOAD

[76] Inventor: Eberhard Röhrig, Kiefernweg 13, 6941 Gorxheimer-Tal, Fed. Rep. of Germany

[21] Appl. No.: 814,346

[22] Filed: Jul. 11, 1977

[30] Foreign Application Priority Data

Jul. 13, 1977 [DE] Fed. Rep. of Germany ....... 2631378

[51] Int. Cl.³ .............................................. B65G 49/00
[52] U.S. Cl. .................... 104/135; 198/472; 198/648; 244/137 R
[58] Field of Search ................. 193/1, 35 R; 198/472, 198/502, 648; 104/135; 244/137 R; 108/51.1, 54.1, 138

[56] References Cited

U.S. PATENT DOCUMENTS

| 2,405,535 | 8/1946 | Weiss | 108/54.1 |
| 2,972,463 | 2/1961 | Matthews et al. | 108/54.1 |
| 3,251,452 | 5/1966 | Conway et al. | 198/460 |
| 3,995,560 | 12/1976 | Mackintosh | 104/1 R |

FOREIGN PATENT DOCUMENTS 1038482 9/1958 Fed. Rep. of Germany .......... 108/54.1

Primary Examiner—James L. Rowland
Attorney, Agent, or Firm—Smyth, Pavitt, Siegemund, Jones & Martella

[57] ABSTRACT

An aircraft pallet is equipped with one or two telescoped pilot plates delineating maximum actual load overhang, to be not more than the roller track can handle.

6 Claims, 5 Drawing Figures

AIRCRAFT PALLET FOR OVER-HANGING LOAD

BACKGROUND OF THE INVENTION

The present invention relates to improvements in an aircraft pallet related to overhanging load. An aircraft pallet within the context of this invention is to refer, for example, to a standard pallet plate of 8×10.5 feet which is about 2,400×3,200 millimeters, in accordance with ISO standards. Such a pallet has edges which have a track defined by a groove with flanges of corrugated contour, i.e. alternating slots and lips.

It is known to use such pallets for loading air cargo having an elevation and contour which is larger than the pallet. Handling of such a pallet on roller tracks and particularly controlling its movement in a freight terminal via a central control is rather complicated. The control of the pallet movement is made difficult by the fact that the pallets change directions, and maneuvering them through the terminal with overhanging load requires the detection of such overhang. The known structure here includes a raster like array of horizontal and vertical light barriers which ascertain the extent of the projection of the cargo. It was found to be particularly difficult to detect, for example, laterally or vertically extending rods or other thin, and possibly pointed objects.

DESCRIPTION OF THE INVENTION

It is an object of the present invention to provide a new and improved aircraft pallet which, if carrying an overhanging load, will be able to cooperate with a single light barrier or scanning beam independently from the contour and position of any overhanging cargo, particularly in the front of the pallet and without interfering with the load as such.

In accordance with the preferred embodiment of the present invention it is suggested to affix, preferably on a telescoping boom, a signalling or pilot plate to one or two edges of a pallet defining in the direction of maximum expected load overhang a particular length dimension that is still larger than that overhung and defining, therefore, a maximum length or width dimension of the pallet commensurate with the maximum dimension a pallet or its load is permitted to have on the particular roller track system across which the pallet is being moved. The pilot plate is affixed in such a manner that the front edge thereof defining the outermost length extension of the pallet-plus-plate assembly in that direction, will traverse a light barrier provided for purposes of ascertaining load overhang. Therefore, the cargo overhung itself does not have to be detected; rather detection can be restricted to the outer-most edge of that signalling or pilot plate and for that task a simple light barrier suffices. The control system, for example, of the roller track will control the pallets in accordance with the dimension defined by the pilot plates but not by the load itself. It is of advantage to mount the pilot plate to the pallet so that the plate itself runs on the roller track. The signalling or pilot plate is directly affixed to a telescoping boom which is releasably affixed preferably to an edge of the pallet, and using a traverse, a pair of arms, and tie down locks for the arms. Play in the connection permits yielding of the cantilevered pilot plate.

DESCRIPTION OF THE DRAWINGS

Proceeding now to the detailed description of the drawings, FIG. 1 illustrates a roller track 1 of the type being used in aircraft freight terminals. A pallet 2 is shown to be disposed on and to move along the roller track. The pallet is assumed to be of standard size, that is 8' by 10.5'. The particular pallet has an edge portion running along all four edges and having a groove 3 as can be seen in FIGS. 3 and 4. The groove has an undulating edge contour in which lips and arcuate flange portions alternate. This kind of fastener track is also standardized and serves normally to receive tie-down anchors for fastening cargo (see, e.g. U.S. Pat. No. 2,743,684).

Figure 1:
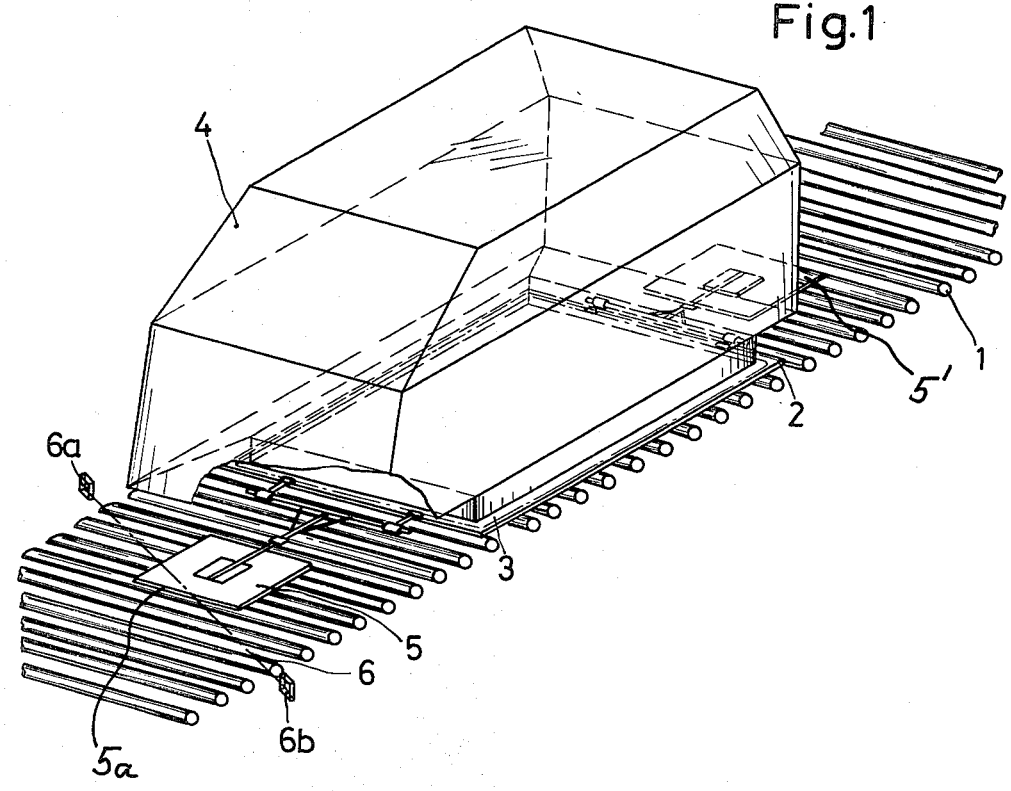
FIG. 1 is a perspective view of a portion of a roller track carrying a pallet with overhanging load, the pallet being provided with two pilot plates, and showing also a single light barrier for controlling the pallet track.

A piece of freight or air cargo 4 has been placed on the pallet 2. The cargo has a base which fits onto the pallet but is larger in upper portions and, therefore, projects laterally to some extent from the pallet but considerably so in the front and in the back. This particular piece of freight is, of course, only an example, demonstrated primarily irregular contour of overhanging cargo that has to be transported.

A signalling or pilot plate 5 is fastened to the front of the pallet and another such plate 5' is fastened to the rear or the other end of the pallet in the direction of movement. These pilot plates are flat metal plates of suitable thickness possibly equivalent to the plate thickness of a pallet or a little thinner, but they should not bend too easily. The pilot plates are rather easily removable from the pallet; the pallet fastening equipment will be described more fully below.

The outer or front edge 5a of the pilot plate 5 is shown to just about intercept a beam of light 6. The light beam 6 is transmitted by a light source 6a, and a sensor 6b is disposed to monitor that beam and any interruption thereof. The light beam extends from one side of the roller track to the other but with a downward component and being in addition oriented obliquely to the direction of movement. This particular light barrier is typical for roller tracks of that type. Decisive is that a single beam suffices to monitor the maximum length dimension of the pallet as loaded, by monitoring the front and rear edges of the pilot plates, there being no overhang beyond these plates.

FIGS. 2a through 2d show various modes of connecting signal or pilot plates to pallets and how these signal plates can be used in order to identify critical dimensions with respect to expected load conditions. In FIGS. 2a through 2d, one and the same pallet is used in all instances, but the Figures differ as to the orientation of the pallet, particularly for aircraft loading. As stated, the pallet itself may have the conventional dimension of 8' by 10.5'. The Figures differ, however, in regard to the direction of maximum overhang in relation to the pallet rectangle and to be identified by the pilot plates. In all instances, the plates are used to adjust the overhung dimension either in longitudinal or in transverse direction and to a maximum spacing of 20'. That dimension may correspond to the operating raster in the roller track system and defines the maximum overhang the track system can handle. This raster dimension can, therefore, be regarded as a unit length dimension to which the pallet-plus-pilot-plate subsystem is adjusted.

Figure 2A:
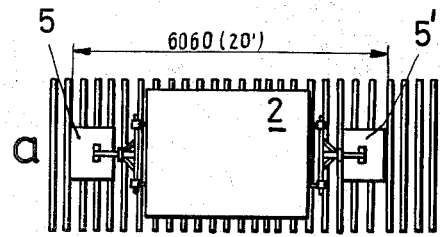
FIGS. 2a, b, c, and d all are elevations for different combinations of pilot plates and air craft pallets in accordance with the preferred embodiment of the present invention.

FIG. 2a illustrates the same situation which is presumed to exist in FIG. 1, that is to say the front and the rear edges of the outermost, transverse edges of the signalling and pilot plates are affixed to the short sides of the pallet. FIG. 2b illustrates a single extended pilot plate being affixed to one short side under the assumption that the load extends over and beyond the boundaries of the pallet in that one direction only and not beyond the other short edge of the pallet. Thus, it is assumed here that the opposite pallet edge itself serves as signalling edge for the beam of the light barrier.

Figure 2C:
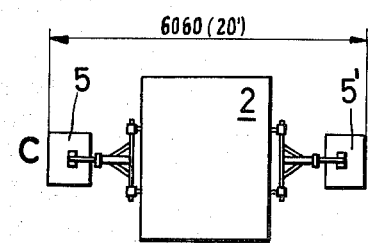
Figure 2B:
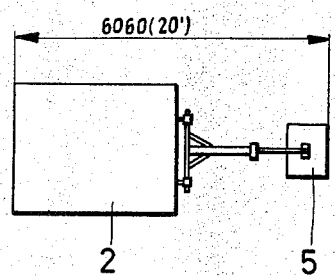
Figure 2D:
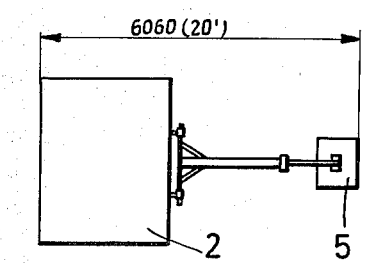

FIGS. 2c and 2d depict analogous situations except that the signalling and pilot plates are affixed to the long sides of the pallet representing lateral overhung load conditions. Considering all FIGS. 2, one can see that the pilot plates appear to be mounted on differently long arms. This may be so because the arms are made differently long, or the arms are made extendable. In either case, different extensions of the pilot plate support arms is an important aspect; in FIG. 2a the arm extension is the shortest in FIG. 3d the arm extension is the longest.

Figure 3:
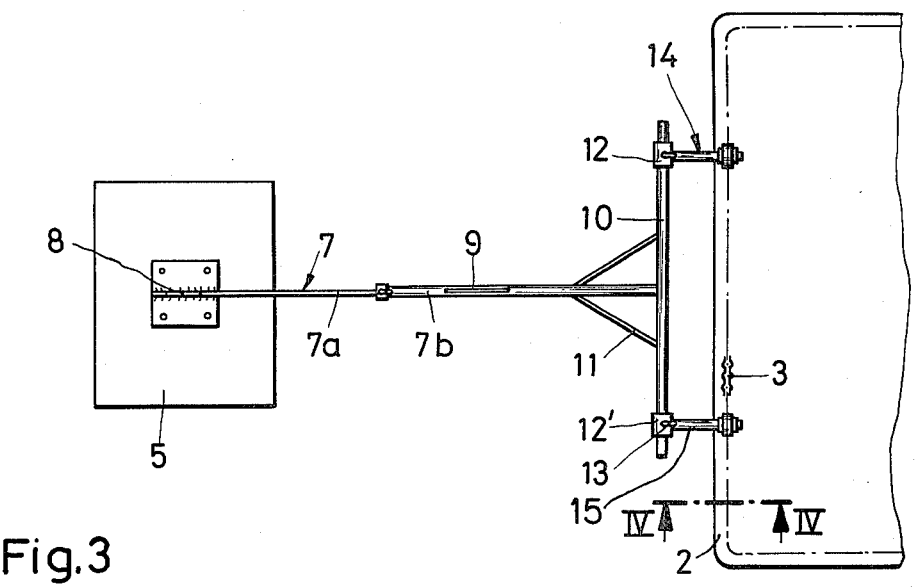
FIG. 3 is an elevational view of a particular construction aspect concerning the pilot plate and its connection to a pallet.
Figure 4:
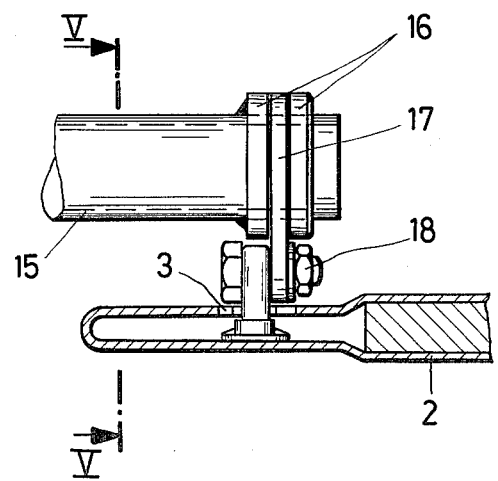
FIG. 4 is a cross-sectional view on an enlarged scale along the lines IV—IV in FIG. 3.
Figure 5:
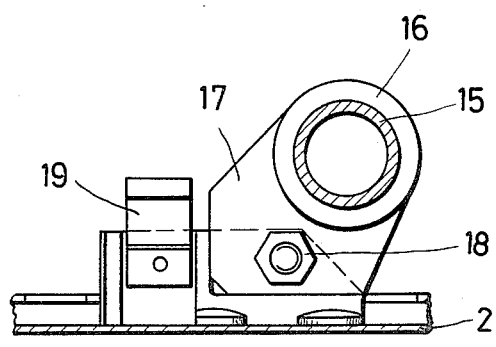
FIG. 5 is a cross-sectional view in accordance with lines V—V of FIG. 4.

Turning now to FIGS. 3, 4, and 5, the construction of these signalling and pilot plates will become apparent from these illustrations. Basically, the plate 5 consists of a sheet of metal of rectangular configuration being affixed to an outrigger-like arm or boom 7. 8 and 9 constitute handles to facilitate handling of the device. The arm 7 is actually of telescope construction in that a rod 7a can be telescoped into a tubular portion 7b. The figures show a two-fold telescoping arrangement but multi-telescoping is, of course, readily conceivable without changing any basic aspects of this invention. The degree of telescoping really will determine whether or not a single plate plus arm (boom) arrangement is to handle all of the different situations as illustrated in FIGS. 2a through 2d. Using no telescoping arrangement is, of course, of advantage from a cost standpoint of an individual pilot plate. A multiple telescope is expensive but more easily damaged. On the other hand, a multiple telescope type unit permits limiting the inventory to a single type unit, while a simpler construction necessitates a larger inventory variety. It was found that a two-piece telescope arm is a practical compromise between inventory and simplicity of construction.

The arm 7, particularly the receiving telescope tube 7b, carries on one end a traverse 10 which is stiffened by means of struts 11. The traverse 10 receives two sleeves, 12, 12', which can slide on the traverse but can be locked thereto by means of a locking lever 13. The sleeves are affixed respectively to one end each of holding arms 14, 15, the two arms being constructed as tubes. Each such tube carries two rings 16, carrying between them a shackle 17 having a relatively large play.

The shackle 17 is bolted to a plug-in type lock 19 by means of bolts 18. The lock is a conventional accessory for pallets, being constructed for locking to the fastener track of pallets as was outlined above. The lock is actually slipped into the groove 3 from above and shifted by half a lip-to-lip distance in the groove in order to be locked and latched under the lips. For release and removal of lock 19, the latch part is lifted against a locking spring whereupon the device can be removed from the groove.

As one can see from FIG. 4, the arms 14, 15 are mounted above the bottom plane of the pallet 2. However, the weight of the cantilevered pilot plate 5 will actually cause the plate to run on the roller track. The play which the lock 19 is permitted to have in the receiving groove as well as a rather loose connection of the shackles 17 to the tubes 14 and 15, enables the pilot plate to undergo some up and down movement so as to compensate for any unevenness of the pallet track without loading the flanges of groove 3 with a bending moment.

The invention is not limited to the embodiments described above but all changes and modifications thereof not constituting departures from the spirit and scope of the invention are intended to be included.

I claim:

1. An aircraft pallet having a main load-bearing portion for use with overhanging loads extending beyond the boundaries of the load-bearing portion and for further use on a roller track which includes sensing means for detecting such overhung loads that extend beyond the pallet, the improvement of at least one flat pilot plate being separate from and not a part of the load-bearing portion and being attachable to said portion in approximate alignment with the pallet bottom and extending beyond a side, a front, or a rear end of the pallet to simulate a larger extension and dimension of the pallet for cooperation with the sensing means.

2. In a pallet as in claim 1, said plate having disposition for running on the track.

3. In a pallet as in claim 1, said boom being of telescoping construction.

4. In a pallet as in claim 1, said plate being affixed to a boom there being means for releasably fastening the boom to an edge of the pallet from which the boom and the plate is to extend laterally away from the pallet.

5. In a pallet as in claim 4, said means including a traverse, sleeves on the traverse slidably disposed thereon but connectable thereto; a pair of holding arms extending from the sleeves and means for locking the other ends of the holding arms to an edge of the pallet.

6. In a pallet as in claim 5, the means for locking including locking means and means for connecting the locking means with play to the arms.

* * * * *